(12) United States Patent
Shveidel et al.

(10) Patent No.: US 12,613,634 B1
(45) Date of Patent: Apr. 28, 2026

(54) ADAPTIVE PROCESSOR CORE SHARING BASED ON WORKLOAD PROPORTION

(71) Applicant: Dell Products L.P., Round Rock, TX (US)

(72) Inventors: Vladimir Shveidel, Pardes Hana-Karkur (IL); Roy Koren, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/928,379

(22) Filed: Oct. 28, 2024

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/0679; G06F 3/0655; G06F 3/061
See application file for complete search history.

(56) References Cited

U.S. PATENT DOCUMENTS

| | | |
|---|---|---|
| 6,766,516 B1 | 7/2004 | Draganic |
| 6,768,744 B1 | 7/2004 | Kumaran et al. |
| 7,383,549 B1 | 6/2008 | Draganic |
| 8,165,033 B1 | 4/2012 | Zhang |
| 2020/0249867 A1* | 8/2020 | Bono .................... G06F 3/0683 |
| 2021/0349762 A1* | 11/2021 | Kamran .............. G06F 11/3024 |

* cited by examiner

*Primary Examiner* — Jane W Benner
(74) *Attorney, Agent, or Firm* — BainwoodHuang

(57) ABSTRACT

A host I/O (Input/Output) request workload including block I/O requests and file I/O requests is received by a data storage system. A file I/O share of the host I/O request workload is detected. The file I/O share of the host I/O request workload indicates a proportion of the host I/O request workload that consists of file I/O requests. The amount of block I/O request processing assigned to an individual shared processor core is modified based on the file I/O share of the host I/O request workload. The shared processor core is shared between a file I/O request processing component of the data storage system and a block I/O request processing component of the data storage system.

14 Claims, 3 Drawing Sheets

FILE I/O SHARE DETECTION LOGIC 204

FILE I/O SHARE 206

CORRECTIVE COEFFICIENT LOGIC 210

CORRECTIVE COEFFICIENT 212

ASSIGNMENT MODIFICATION LOGIC 214

MODIFIED AMOUNTS OF BLOCK I/O PROCESSING FOR SHARED CORES 216

BLOCK I/O REQUESTS 127 & 129 (FROM HOSTS AND FILE I/O REQUEST PROCESSING COMPONENT)

BLOCK I/O REQUEST ASSIGNMENT LOGIC 202

BLOCK I/O REQUEST PROCESSING ASSIGNMENTS 208

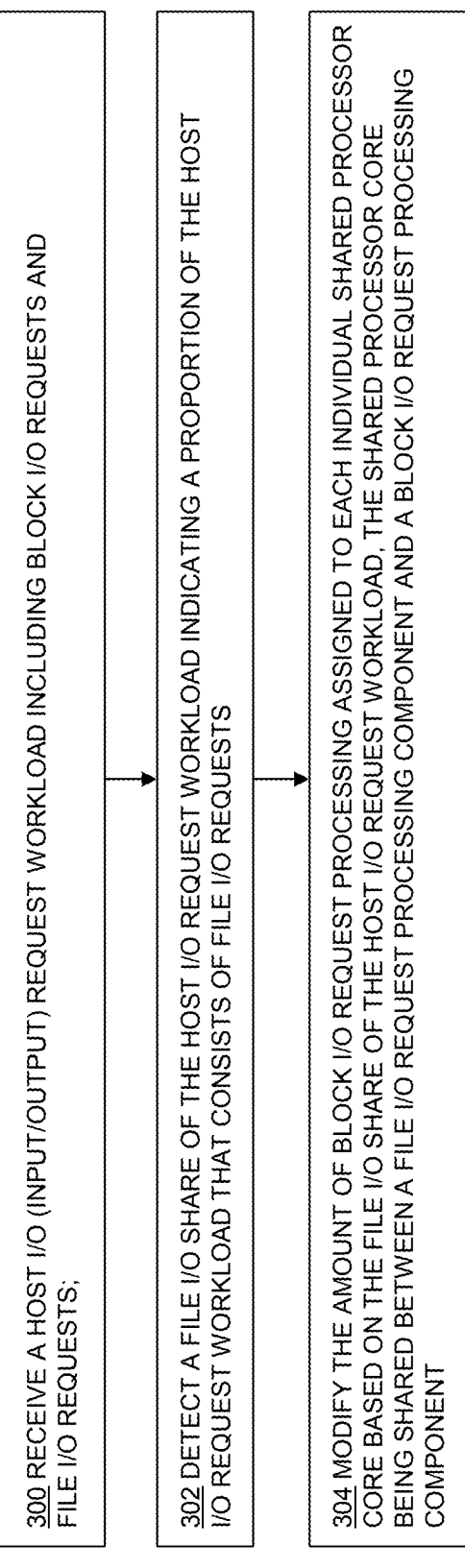

300 RECEIVE A HOST I/O (INPUT/OUTPUT) REQUEST WORKLOAD INCLUDING BLOCK I/O REQUESTS AND FILE I/O REQUESTS;

302 DETECT A FILE I/O SHARE OF THE HOST I/O REQUEST WORKLOAD INDICATING A PROPORTION OF THE HOST I/O REQUEST WORKLOAD THAT CONSISTS OF FILE I/O REQUESTS

304 MODIFY THE AMOUNT OF BLOCK I/O REQUEST PROCESSING ASSIGNED TO EACH INDIVIDUAL SHARED PROCESSOR CORE BASED ON THE FILE I/O SHARE OF THE HOST I/O REQUEST WORKLOAD, THE SHARED PROCESSOR CORE BEING SHARED BETWEEN A FILE I/O REQUEST PROCESSING COMPONENT AND A BLOCK I/O REQUEST PROCESSING COMPONENT

Fig. 3

ADAPTIVE PROCESSOR CORE SHARING BASED ON WORKLOAD PROPORTION

TECHNICAL FIELD

The present disclosure relates generally to data storage systems that share processor cores between data storage services.

BACKGROUND

Data storage systems are arrangements of hardware and software that are coupled to non-volatile data storage drives, such as solid-state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

SUMMARY

In the disclosed technology a host I/O (Input/Output) request workload is received by a data storage system. The host I/O request workload includes block I/O requests and file I/O requests. A file I/O share of the host I/O request workload is detected. The file I/O share of the host I/O request workload indicates a proportion of the host I/O request workload that consists of file I/O requests. The amount of block I/O request processing assigned to an individual shared processor core is modified based on the file I/O share of the host I/O request workload. The shared processor core is shared between a file I/O request processing component of the data storage system and a block I/O request processing component of the data storage system.

In some embodiments, modifying the amount of block I/O request processing assigned to the shared processor core includes reducing the amount of block I/O request processing assigned to the shared processor core in response to the file I/O share of the host I/O request workload having a non-zero value.

In some embodiments, modifying the amount of block I/O request processing assigned to the shared processor core includes dynamically reducing the amount of block I/O request processing assigned to the shared processor core by larger amounts for larger values of file I/O share of the host I/O request workload.

In some embodiments, modifying the amount of block I/O request processing assigned to the shared processor core further includes calculating a corrective coefficient that is inversely related to the file I/O share of the host I/O request workload and reducing the amount of block I/O request processing assigned to the shared processor core by an amount according to the corrective coefficient.

In some embodiments, modifying the amount of block I/O request processing assigned to the shared processor core further includes, responsive to any value of the file I/O share of the host I/O request workload that is above a predetermined threshold, setting the corrective coefficient to zero, thereby reserving the shared processor core for exclusive execution of the file I/O request processing component.

In some embodiments, modifying the amount of block I/O request processing assigned to the shared processor core further includes, for values of the file I/O share of the host I/O request workload that are greater than the predetermined threshold, voluntarily yielding the shared processor core by the block I/O processing component to the operating system for immediate execution of the file I/O request processing component.

In some embodiments, the block I/O request processing component receives block I/O requests from at least one host and from the file I/O request processing component, and the amount of block I/O request processing assigned to the shared processor core is an amount of block I/O request processing includes processing one or more block I/O requests received by the block I/O request processing component from the host and one or more block I/O requests received from the file I/O request processing component.

In some embodiments, the file I/O request processing component is a containerized service that provides a file-based data storage service to the host and the block I/O request processing component provides a block-based data storage service to the host.

In some embodiments, the amount of block I/O request processing assigned to the shared processor core before modification is based at least in part on the block I/O request processing latency of the shared processor core.

In some embodiments, the shared processor core is one of multiple processor cores within a shared portion of processor cores within the data storage system. Each processor core in the shared portion of the processor cores is shared between the block I/O request processing component and the file I/O request processing component. The data storage system further includes a plurality of processor cores in a non-shared portion of processor cores, and each processor core in the non-shared portion of the data storage system processor cores is used exclusively by the block I/O request processing component.

The disclosed technology is integral to providing a practical technical solution to shortcomings present in other technologies. For example, the disclosed technology provides improved file I/O request processing performance in a data storage system that shares processor cores between an internal file I/O request processing component and an internal block I/O request processing component, and in which the block I/O request processing component receives block I/O requests both from external hosts and from the internal file I/O request processing component. At times where the workload of the data storage system consists significantly or predominantly of file I/O requests, the disclosed technology reduces the amount of block I/O request processing (e.g. the number of block I/O requests) that has been assigned to individual shared processor cores. As a result, the disclosed technology avoids disproportionate and unacceptable increases in the latency of the file I/O request processing component that may be caused by the sharing of some processor cores with the block I/O request processing component and maintains high overall performance of the data storage system.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 3 is a flow chart showing an example of steps performed in some embodiments of the disclosed technology.

DETAILED DESCRIPTION

Figure 1:
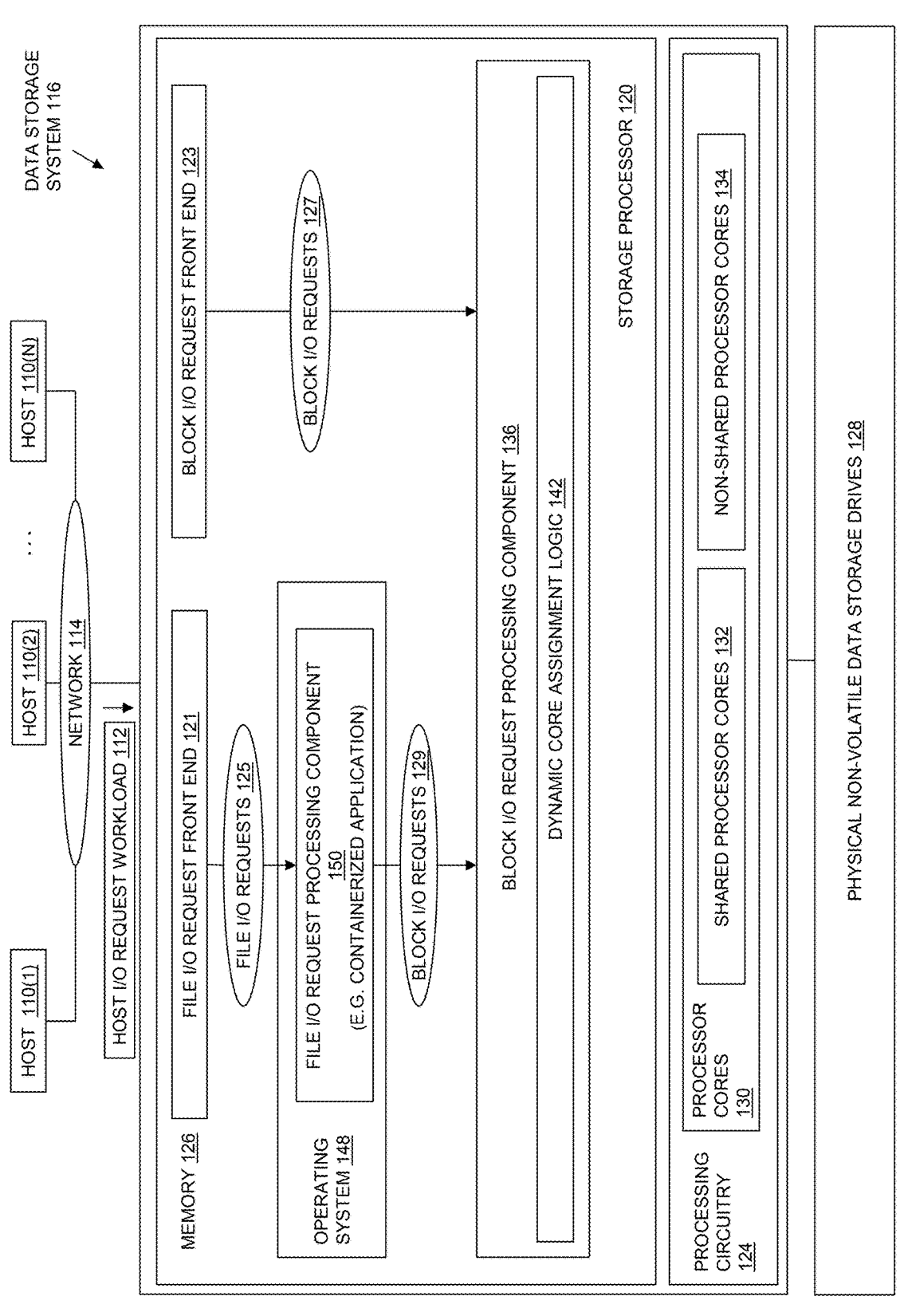
FIG. 1 is a block diagram showing an illustrative embodiment of the disclosed technology.

Embodiments will now be described with reference to the figures. The embodiments described herein are provided only as examples, in order to illustrate various features and principles of the disclosed technology and are not limiting. The embodiments of the disclosed technology described herein are integrated into a practical technical solution that supports high overall performance of a data storage system under differing types of workloads where some processor cores are shared between an internal file I/O request processing component and an internal block I/O request processing component.

In the technology described herein, a data storage system receives a host I/O (Input/Output) request workload that may include a mix of both block I/O requests and file I/O requests. The disclosed technology detects a current file I/O share of the host I/O request workload. The file I/O share of the host I/O request workload is the current proportion of the host I/O request workload that consists of file I/O requests. As described further herein, an amount of block I/O request processing assigned to an individual shared processor core is then modified based on the detected file I/O share of the host I/O request workload. The shared processor core is one of multiple processor cores that are shared between execution of a file I/O request processing component of the data storage system and execution of a block I/O request processing component of the data storage system.

The amount of block I/O request processing assigned to the shared processor core may be modified by reducing the amount of block I/O request processing assigned to the shared processor core in response to the file I/O share of the host I/O request workload having a non-zero value.

The amount of block I/O request processing assigned to the shared processor core may be modified by dynamically reducing the amount of block I/O request processing assigned to the shared processor core by larger amounts for larger values of file I/O share of the host I/O request workload.

The amount of block I/O request processing assigned to the shared processor core may further be modified by calculating a corrective coefficient that is inversely related to the file I/O share of the host I/O request workload and then reducing the amount of block I/O request processing assigned to the shared processor core by an amount according to the corrective coefficient.

The amount of block I/O request processing assigned to the shared processor core may further be modified by, in response to any value of the file I/O share of the host I/O request workload that is above a predetermined threshold, setting the corrective coefficient to zero, causing the shared processor core to be temporarily reserved for exclusive execution of the file I/O request processing component.

The amount of block I/O request processing assigned to the shared processor core may further be modified by, for values of the file I/O share of the host I/O request workload greater than the predetermined threshold, voluntarily yielding the shared processor core by the block I/O processing component for immediate execution of the file I/O request processing component.

The block I/O request processing component may receive block I/O requests both from a host and from the file I/O request processing component, and the amount of block I/O request processing that was assigned to the shared processor core may include processing both i) block I/O requests received by the block I/O request processing component from the host and ii) block I/O requests received by the block I/O request processing component from the file I/O request processing component.

The file I/O request processing component may be a containerized service that provides a file-based data storage service to the host and the block I/O request processing component may be an application that provides a block-based data storage service to the host.

The amount of block I/O request processing assigned to the shared processor core before modification may be an amount of block I/O request processing that was generated based on the block I/O request processing latency of the shared processor core.

The shared processor core may be one of multiple processor cores within a shared portion of processor cores of the data storage system. Each processor core in the shared portion of the processor cores is shared between execution of the block I/O request processing component and the file I/O request processing component. The data storage system may further include multiple processor cores in a non-shared portion of processor cores, and each processor core in the non-shared portion of processor cores is used exclusively for execution of the block I/O request processing component.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. though one or more communication interfaces. No particular hardware configuration is required, and Storage Processor 120 may be embodied as any specific type of device that is capable of processing host input/output (I/O) requests (e.g. I/O read requests and I/O write requests, etc.), and of persistently storing host data.

The Physical Non-Volatile Data Storage Drives 128 may include physical data storage drives such as solid-state drives, magnetic disk drives, hybrid drives, optical drives, and/or other specific types of drives.

A Memory 126 in Storage Processor 120 stores program code that is executed on Processing Circuitry 124, as well as data generated and/or processed by such program code. Memory 126 may include volatile memory (e.g. RAM), and/or other types of memory.

Processing Circuitry 124 includes or consists of multiple Processor Cores 130, e.g. within one or more multi-core processor packages. Each processor core in Processor Cores 130 includes or consists of a separate processing unit, sometimes referred to as a Central Processing Unit (CPU). Each individual processor core in Processor Cores 130 is made up of separate electronic circuitry that is capable of independently executing instructions. Processor Cores 130 includes a shared portion, shown by Shared Processor Cores 132. Shared Processor Cores 132 are processor cores that are shared between Block I/O Request Processing Component 136 and File I/O Request Processing Component 150. Accordingly, each processor core in Shared Processor Cores 132 may execute Block I/O Request Processing Component 136 and/or File I/O Request Processing Component 150. Processor Cores 130 also includes a non-shared portion, shown by Non-Shared Processor Cores 134. Non-Shared Processor Cores 134 are processor cores that are used exclusively by Block I/O Request Processing Component 136. Accordingly, each processor core in Non-Shared Processor Cores 134 executes only Block I/O Request Processing Component 136.

Processing Circuitry 124 and Memory 126 together form control circuitry that is configured and arranged to carry out various methods and functions described herein. Memory 126 stores a variety of software components that may be provided in the form of executable program code. For example, Memory 126 may include software components such as File I/O Request Front End 121, Block I/O Request Front End 123, Block I/O Request Processing Component 136 and Operating System 148. When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Block I/O Request Processing Component 136 is an application executing in Data Storage System 116, and provides block-based (aka "block level") data storage service to both Hosts 110 and File I/O Request Processing Component 150. Block-based I/O requests received by Data Storage System 116 in Host I/O Request Workload 112 are referred to as block I/O requests. For example, block I/O requests that are received from Hosts 110 as part of Host I/O Request Workload 112 may be initially received by Block I/O Request Front End 123 and then passed to Block I/O Request Processing Component 136 as Block I/O Requests 127. The Block I/O Requests 127 processed by Block I/O Request Processing Component 136 indicate blocks of host data that are written to and/or read from blocks of Physical Non-Volatile Data Storage 128 by Block I/O Request Processing Component 136 when Block I/O Request Processing Component 136 processes Block I/O Requests 127. The block I/O requests in Host I/O Request Workload 112 that are received by Block I/O Request Front End 123 are communicated by Hosts 110 to Data Storage System 116 using a block-based storage protocol that is supported by Block I/O Request Front End 123. In this way, Block I/O Request Front End 123 and Block I/O Request Processing Component 136 enable the Hosts 110 to connect to Data Storage System 116 using a block-based data storage protocol. Examples of block-based data storage protocols that may be supported by Block I/O Request Front End 123 and/or Block I/O Request Processing Component 136 include without limitation Fibre Channel (FC), Internet Small Computer Systems Interface (iSCSI), and/or Non-Volatile Memory Express (NVMe) protocols.

While only one block I/O request front end is shown for purposes of concise illustration in FIG. 1, multiple block I/O front ends may be used, with each receiving those block I/O requests in Host I/O Request Workload 112 that are conveyed to Data Storage System 116 using a corresponding block-based data storage protocol. In such embodiments, each one of the multiple block I/O request front ends performs any necessary pre-processing on the block I/O requests that it receives, and then forwards the block I/O requests as part of Block I/O Requests 127, e.g. to an Application Programming Interface (API) of Block I/O Request Processing Component 136.

Block I/O Request Processing Component 136 also provides block-based data storage service to File I/O Request Processing Component 150, and processes block I/O requests that are generated by File I/O Request Processing Component 150 (e.g. Block I/O Requests 129) as a result of File I/O Request Processing Component 150 processing File I/O Requests 125. For example, Block I/O Requests 129 may be generated by a backend of File I/O Request Processing Component 150, and indicate blocks of host data to be written to and/or read from specified blocks of Physical Non-Volatile Data Storage 128 by Block I/O Request Processing Component 136. File I/O Request Processing Component 150 also forwards Block I/O Requests 129 to Block I/O Request Processing Component 136 through an Application Programming Interface (API) of Block I/O Request Processing Component 136.

In the example of FIG. 1, File I/O Request Processing Component 150 is a containerized service that is installed in Operating System 148 and executes in Data Storage System 116. File I/O Request Processing Component 150 may, for example, include file-based data storage service logic that provides a file-level data storage service to Hosts 110, and is packaged with its own software logic, libraries, and/or configuration files in a software container that is installed into Operating System 148. For example, in some embodiments, File I/O Request Processing Component 150 may be provided as a Docker container hosted in a Docker Engine, as developed by Docker, Inc.

The file-based data storage service provided by File I/O Request Processing Component 150 processes file-based I/O requests ("file I/O requests") received by Data Storage System 116 from Hosts 110 in Host I/O Request Workload 112. For example, those file-based I/O requests that are received from Hosts 110 as part of Host I/O Request Workload 112 may initially be received by File I/O Request Front End 121 and then passed to File I/O Request Processing Component 150 as File I/O Requests 125. The File I/O Requests 125 received from Hosts 110 and processed by File I/O Request Processing Component 150 access files that are served by File I/O Request Processing Component 150 to the Hosts 110 and are stored in the Physical Non-Volatile Data Storage Drives 128. File I/O Request Processing Component 150 provides file-level storage and acts as Network Attached Storage (NAS) for the Hosts 110. The File I/O Requests 125 processed by File I/O Request Processing Component 150 are communicated to Data Storage System 116 by Hosts 110 using a file-based storage protocol that is supported by File I/O Request Front End 121 and/or File I/O Request Processing Component Service 150. In this way, File I/O Request Front End 121 and File I/O Request Processing Component 150 enable Hosts 110 to connect to Data Storage System 116 using a file-based data storage protocol. Examples of file-based storage protocols that may be supported by File I/O Request Front end 121 and/or File I/O Request Processing Component 150 include without limitation Network File System (NFS) and/or Server Message Block (SMB) protocols. While only one file I/O request front end is shown for purposes of illustration in FIG. 1, multiple file I/O front ends may be used, with each one receiving file I/O requests from Hosts 110 that are conveyed to Data Storage System 116 using a corresponding file-based data storage protocol, performing any necessary pre-processing, and then forwarding the requests to File I/O Request Processing Component 150 in File I/O Requests 125 through an Application Programming Interface (API) of File I/O Request Processing Component 150.

As shown in FIG. 1, Data Storage System 116 receives a Host I/O Request Workload 112 that includes a mix of both block I/O requests and file I/O requests. Dynamic Core Assignment Logic 142 periodically detects a current file I/O share of Host I/O Request Workload 112. The file I/O share of Host I/O Request Workload 112 is the current proportion of Host I/O Request Workload 112 that consists of file I/O requests. For example, file I/O share may be represented as a percentage of Host I/O Request Workload 112 that is made up of file I/O requests. For example, in the case where Host I/O Request Workload 112 is made up entirely of block I/O requests, file I/O share is 0%. In another example, in the case where Host I/O Request Workload 112 is made up entirely of file I/O requests, file I/O share is 100%. And in another example, in the case where Host I/O Request Workload 112 is half file I/O requests, file I/O share is 50%. Those skilled in the art will recognize that the preceding examples of file I/O share are given only for explanatory purposes, and that embodiments of the disclosed technology may detect any specific value of file I/O share.

Dynamic Core Assignment Logic 142 then modifies the amount of block I/O request processing assigned to each individual shared processor core, i.e. the amount of block I/O request processing assigned to each processor core in Shared Processor Cores 132, based on the file I/O share detected in Host I/O Request Workload 112.

In some embodiments, Dynamic Core Assignment Logic 142 may modify the amount of block I/O request processing assigned to each shared processor core by reducing the amount of block I/O request processing assigned to each shared processor core in response to the file I/O share of Host I/O Request Workload 112 having a non-zero value. In such embodiments, in cases where the file I/O share of Host I/O Request Workload 112 is greater than zero, Dynamic Core Assignment Logic 142 reduces the amount of block I/O request processing assigned to each shared processor core. Dynamic Core Assignment Logic 142 reduces the amount of block I/O request processing assigned to each shared processor core by larger amounts for larger values of the file I/O share of Host I/O Request Workload 112.

In some embodiments, Dynamic Core Assignment Logic 142 modifies the amount of block I/O request processing assigned to each shared processor core by calculating a corrective coefficient that is inversely related to the file I/O share of Host I/O Request Workload 112, and then reducing the amount of block I/O request processing that was assigned to each shared processor core by an amount according to the corrective coefficient. Because the corrective coefficient is inversely related to the file I/O share of Host I/O Request Workload 112, lower values of the corrective coefficient are calculated for higher values of file I/O share of Host I/O Request Workload 112, and vice versa. For example, in some embodiments, in the case where Host I/O Request Workload 112 is made up entirely of block I/O requests, then the file I/O share of Host I/O Request Workload 112 is 0%, and a corrective coefficient of 1 is calculated. In such a case, there is no reduction in the amount of block I/O request processing assigned to each shared processor core. In contrast, at the other extreme, in the case where Host I/O Request Workload 112 is made up entirely of file I/O requests, file I/O share of Host I/O Request Workload 112 is 100%, and a corrective coefficient of 0 is calculated. In such a case, the amount of block I/O request processing assigned to each shared processor core is reduced to zero, thereby causing all shared processor cores to execute File I/O Request Processing Component 150 only, which causes block I/O request processing to be exclusively performed on Non-Shared Processor Cores 134.

For values of file I/O share of Host I/O Request Workload 112 that are between 0% and 100%, corrective coefficient values may be calculated by selecting predetermined corresponding corrective coefficient values. Such predetermined corrective coefficient values may be hardcoded. For example, corrective coefficient values may be predetermined based on benchmark testing that indicates the corrective coefficient values that provide optimal overall data storage system performance (e.g. lowest total I/O request latency across both block I/O requests and file I/O requests) for specific values of file I/O share of Host I/O Request Workload 112. For example, in the case where file I/O share of Host I/O Request Workload 112 is 75%, a predetermined corresponding corrective coefficient may be 25%. The amount of block I/O request processing assigned to each one of the shared processor cores in Shared Processor Cores 132 is reduced to 25% of the amount of block I/O request processing that was assigned to that shared processor core. In some embodiments, corrective coefficients corresponding to specific values or ranges of values of file I/O share of Host I/O Request Workload 112 may also be adjusted dynamically over time to provide optimal overall data storage system performance.

The calculated corrective coefficient is a global value after and is applied equally to the amount of block I/O request processing assigned to each individual shared processor cores in Shared Processor Cores 132. A different amount of block I/O request processing (e.g., a different number of block I/O requests to be processed by execution of Block I/O Request Component 136 on the shared processor core) may be assigned to each individual shared processor core in Shared Processor Cores 132. Accordingly, in an example where the calculated corrective coefficient is 25%, and where four block I/O requests were assigned to be processed by execution of Block I/O Request Processing Component 136 on a first shared processor core in Shared Processor Cores 132, Dynamic Core Assignment Logic 142 reduces the amount of block I/O request processing assigned to that shared processor core by an amount according to the corrective coefficient of 25% by reducing the number of block I/O requests assigned to be processed by execution of Block I/O Request Processing Component 136 on that shared processor core to one. Similarly, in the same example where the calculated corrective coefficient is 25% and in the case where one hundred block I/O requests were assigned to be processed by execution of Block I/O Request Processing Component 136 on another one of the shared processor cores, Dynamic Core Assignment Logic 142 reduces the amount of block I/O request processing assigned to that shared processor core by an amount according to the corrective coefficient of 25% by reducing the number of block I/O requests assigned to be processed by execution of Block I/O Request Processing Component 136 on that shared processor core to twenty five.

Those skilled in the art will recognize that the above examples using specific corrective coefficient values and amounts of block I/O request processing assigned to individual shared processor cores are given only for explanatory purposes, and that operation of the disclosed technology is not limited to operation with those specific values or amounts.

In some embodiments, Dynamic Core Assignment Logic 142 operates in response to detecting a value of the file I/O share of Host I/O Request Workload 112 that is above a predetermined threshold (e.g. above 90%) by setting the corrective coefficient to zero, in order to cause each shared processor core in Shared Processor Cores 132 to be temporarily reserved for exclusive execution of the File I/O Request Processing Component 150. In addition, the disclosed technology may be embodied such that Dynamic Core Assignment Logic 142 further operates in response to detecting a value of the file I/O share of Host I/O Request Workload 112 that is above the predetermined threshold by causing Block I/O Request Processing Component 136 to voluntarily yield each shared processor core in Shared Processor Cores 132 to Operating System 148, thus enabling immediate execution of File I/O Request Processing Component 150.

As described above, Block I/O Request Processing Component 136 receives block I/O requests both from Hosts 110 and from File I/O Request Processing Component 150. Accordingly, the amount of block I/O request processing that is assigned by Dynamic Core Assignment Logic 142 to each shared processor core in Shared Processor Cores 132 may include processing of both i) one or more block I/O requests received by Block I/O Request Processing Component 136 from Hosts 110 (e.g. one or more of Block I/O Requests 127) and ii) one or more block I/O requests received by Block I/O Request Processing Component 136 from File I/O Request Processing Component (e.g. one or more of Block I/O Requests 129).

In some embodiments, Dynamic Core Assignment Logic 142 generates the amounts of block I/O request processing that are assigned to individual shared processor cores in Shared Processor Cores 132 to optimize performance when performing block I/O request processing. For example, the amounts of block I/O request processing assigned to individual shared processor cores may be based on the block I/O request processing latency being experienced on individual shared processor cores. In such a case, the amounts of block I/O request processing that are assigned to individual shared processor cores in Shared Processor Cores 132 may be generated to optimize the average latency of processing block I/O requests across all the processor cores in Processor Cores 130, e.g. by preferentially assigning more block I/O requests for processing on those processor cores currently exhibiting relatively lower latency.

Figure 2:
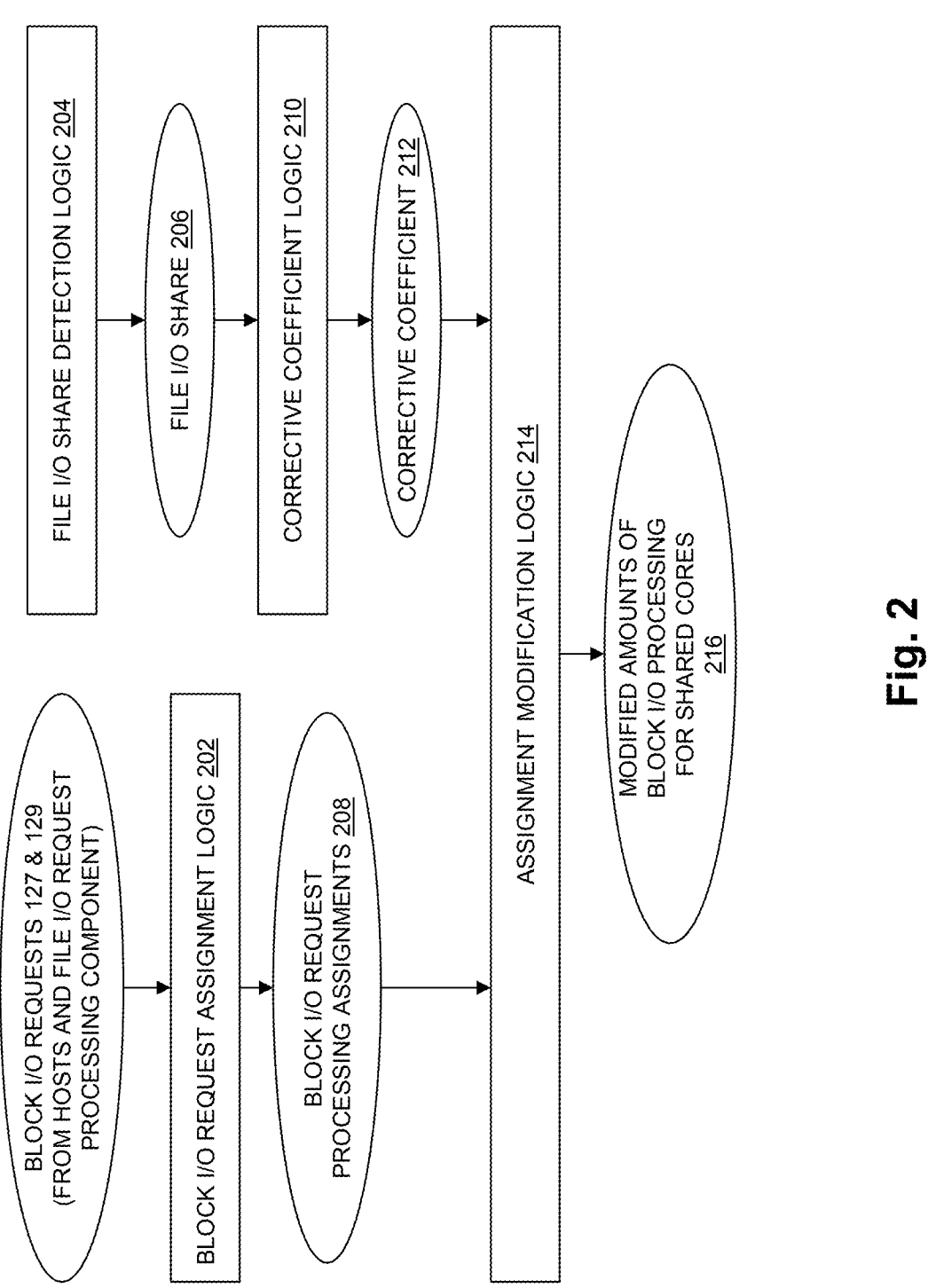
FIG. 2 is a block diagram showing an example of components in some embodiments of the disclosed technology.

FIG. 2 is a block diagram showing an example of components operating within the Dynamic Core Assignment Logic 142 in some embodiments. As shown in FIG. 2, Block I/O Request Assignment Logic 202 detects received block I/O requests that have not yet been processed, e.g. including block I/O requests received from Hosts 110 in Block I/O Requests 127 and block I/O requests received from File I/O Request Processing Component 150 in Block I/O Requests 129. Block I/O Request Assignment Logic 202 then generates amounts of block I/O request processing that are assigned to individual processor cores in Processor Cores 132 such that overall block I/O request processing performance is optimized. The amount of block I/O request processing assigned to each processor core is the number of block I/O requests that are assigned for processing by execution of Bock I/O Request Processing Component 136 on that processor core. For example, Block I/O Request Assignment Logic 202 may preferentially assign relatively larger numbers of block I/O requests to those processor cores exhibiting lower block I/O request processing latency. As shown by Block I/O Request Processing Assignments 208, the amounts of block I/O request processing that are assigned to individual processor cores by Block I/O Request Processing Assignment Logic 202 are passed to Assignment Modification Logic 214. Block I/O Request Processing Assignments 208 may include amounts of block I/O request processing that are assigned to all processor cores in Processor Cores 130, e.g. individual processor cores in Shared Processor Cores 132 and Non-Shared Processor Cores 134.

File I/O Share Detection Logic 204 periodically detects the current file I/O share of Host I/O Request Workload 112. The current file I/O share of Host I/O Request Workload 112 is the current proportion of Host I/O Request Workload 112 that consists of file I/O requests. The current file I/O share of Host I/O Request Workload 112 is passed to Corrective Coefficient Logic 210, as shown by File I/O Share 206.

Corrective Coefficient Logic 210 calculates Corrective Coefficient 212 based on File I/O Share 206, as described above with reference to FIG. 1. Corrective Coefficient 212 is then passed to Assignment Modification Logic 214.

Assignment Modification Logic 214 modifies the amount of block I/O request processing assigned to each shared processor core in Shared Processor Cores 132 by an amount according to the Corrective Coefficient 212. In this way, Modified Amounts of Block I/O Processing for Shared Cores 216 may be generated based on File I/O Share 206.

FIG. 3 is a flow chart showing an example of steps performed in some embodiments.

At step 300, a host I/O request workload is received that includes host block I/O requests and file I/O requests.

At step 302, a file I/O share of the host I/O request workload is detected indicating a proportion of the host I/O request workload that consists of file I/O requests.

At step 304, the amount of block I/O request processing assigned to each individual shared processor core is modified based on the file I/O share of the host I/O request workload. The shared processor core is shared between a file I/O request processing component and a block I/O request processing component.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

receiving a host I/O (Input/Output) request workload by a data storage system, the host I/O request workload including block I/O requests and file I/O requests;

detecting a file I/O share of the host I/O request workload, wherein the file I/O share of the host I/O request workload indicates a proportion of the host I/O request workload that consists of file I/O requests; and modifying an amount of block I/O request processing assigned to a shared processor core based on the file I/O share of the host I/O request workload, wherein the shared processor core is shared between a file I/O request processing component of the data storage system and a block I/O request processing component of the data storage system, wherein modifying the amount of block I/O request processing assigned to the shared processor core includes reducing the amount of block I/O request processing assigned to the shared processor core in response to the file I/O share of the host I/O request workload having a non-zero value at least in part by calculating a corrective coefficient that is inversely related to the file I/O share of the host I/O request workload and reducing the amount of block I/O request processing assigned to the shared processor core by an amount according to the corrective coefficient.

2. The method of claim 1, wherein modifying the amount of block I/O request processing assigned to the shared processor core further comprises, responsive to any value of the file I/O share of the host I/O request workload above a predetermined threshold, setting the corrective coefficient to zero, thereby reserving the shared processor core for exclusive execution of the file I/O request processing component.

3. The method of claim 2, wherein modifying the amount of block I/O request processing assigned to the shared processor core further comprises, for values of the file I/O share of the host I/O request workload greater than the predetermined threshold, voluntarily yielding the shared processor core by the block I/O processing component for immediate execution of the file I/O request processing component.

4. The method of claim 3, wherein the block I/O request processing component receives block I/O requests from at least one host and from the file I/O request processing component; and wherein the amount of block I/O request processing assigned to the shared processor core includes processing block I/O requests received by the block I/O request processing component from the host and block I/O requests received from the file I/O request processing component.

5. The method of claim 4, wherein the file I/O request processing component comprises a containerized service that provides a file-based data storage service to the host; and wherein the block I/O request processing component provides a block-based data storage service to the host.

6. The method of claim 5, wherein the amount of block I/O request processing assigned to the shared processor core before modification is based at least in part on a block I/O request processing latency of the shared processor core.

7. The method of claim 6, wherein the shared processor core is one of a plurality of processor cores in a shared portion of processor cores in the data storage system, wherein each processor core in the shared portion of the processor cores is shared between the block I/O request processing component and the file I/O request processing component; and wherein the data storage system further includes a plurality of processor cores in a non-shared portion of processor cores, wherein each processor core in the non-shared portion of processor cores is used exclusively by the block I/O request processing component.

8. A data storage system comprising:

processing circuitry and a memory;

a plurality of non-volatile data storage drives; and wherein the memory has program code stored thereon, wherein the program code, when executed by the processing circuitry, causes the processing circuitry to:

receive a host I/O (Input/Output) request workload by a data storage system, the host I/O request workload including block I/O requests and file I/O requests, detect a file I/O share of the host I/O request workload, wherein the file I/O share of the host I/O request workload indicates a proportion of the host I/O request workload that consists of file I/O requests, and modify an amount of block I/O request processing assigned to a shared processor core based on the file I/O share of the host I/O request workload, wherein the shared processor core is shared between a file I/O request processing component of the data storage system and a block I/O request processing component of the data storage system, wherein the amount of block I/O request processing assigned to the shared processor core is modified by reducing the amount of block I/O request processing assigned to the shared processor core in response to the file I/O share of the host I/O request workload having a non-zero value at least in part by calculating a corrective coefficient that is inversely related to the file I/O share of the host I/O request workload and reducing the amount of block I/O request processing assigned to the shared processor core by an amount according to the corrective coefficient.

9. The data storage system of claim 8, wherein the program code, when executed by the processing circuitry, further causes the processing circuitry to modify the amount of block I/O request processing assigned to the shared processor core by, responsive to any value of the file I/O share of the host I/O request workload above a predetermined threshold, setting the corrective coefficient to zero, thereby reserving the shared processor core for exclusive execution of the file I/O request processing component.

10. The data storage system of claim 9, wherein the program code, when executed by the processing circuitry, further causes the processing circuitry to modify the amount of block I/O request processing assigned to the shared processor core further by, for values of the file I/O share of the host I/O request workload greater than the predetermined threshold, voluntarily yielding the shared processor core by the block I/O processing component for immediate execution of the file I/O request processing component.

11. The data storage system of claim 10, wherein the block I/O request processing component receives block I/O requests from at least one host and from the file I/O request processing component; and wherein the amount of block I/O request processing assigned to the shared processor core includes processing block I/O requests received by the block I/O request processing component from the host and block I/O requests received from the file I/O request processing component.

12. The data storage system of claim 11, wherein the file I/O request processing component comprises a containerized service that provides a file-based data storage service to the host; and wherein the block I/O request processing component provides a block-based data storage service to the host.

13. The data storage system of claim 12, wherein the amount of block I/O request processing assigned to the shared processor core before modification is based at least in part on a block I/O request processing latency of the shared processor core;

wherein the shared processor core is one of a plurality of processor cores in a shared portion of processor cores in the data storage system, wherein each processor core in the shared portion of the processor cores is shared between the block I/O request processing component and the file I/O request processing component; and wherein the data storage system further includes a plurality of processor cores in a non-shared portion of processor cores, wherein each processor core in the non-shared portion of processor cores is used exclusively by the block I/O request processing component.

14. A computer program product including a non-transitory computer readable medium having instructions stored thereon, wherein the instructions, when executed on processing circuitry, cause the processing circuitry to perform steps including:

receiving a host I/O (Input/Output) request workload by a data storage system, the host I/O request workload including block I/O requests and file I/O requests;

detecting a file I/O share of the host I/O request workload, wherein the file I/O share of the host I/O request workload indicates a proportion of the host I/O request workload that consists of file I/O requests; and modifying an amount of block I/O request processing assigned to a shared processor core based on the file I/O share of the host I/O request workload, wherein the shared processor core is shared between a file I/O request processing component of the data storage system and a block I/O request processing component of the data storage system, wherein modifying the amount of block I/O request processing assigned to the shared processor core includes reducing the amount of block I/O request processing assigned to the shared processor core in response to the file I/O share of the host I/O request workload having a non-zero value at least in part by calculating a corrective coefficient that is inversely related to the file I/O share of the host I/O request workload and reducing the amount of block I/O request processing assigned to the shared processor core by an amount according to the corrective coefficient.

* * * * *